United States Patent
Khambati et al.

(10) Patent No.: US 10,943,510 B2
(45) Date of Patent: *Mar. 9, 2021

(54) CUSTOMIZED CHEST RESPONSE FINITE ELEMENT MODEL FOR CRASH TEST DUMMY AND METHOD

(71) Applicant: Humanetics Innovative Solutions, Inc., Farmington Hills, MI (US)

(72) Inventors: Suraush Khambati, Farmington Hills, MI (US); Shiva Shetty, Farmington Hills, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/747,979

(22) PCT Filed: Aug. 30, 2016

(86) PCT No.: PCT/US2016/049414
§ 371 (c)(1),
(2) Date: Jan. 26, 2018

(87) PCT Pub. No.: WO2017/040483
PCT Pub. Date: Mar. 9, 2017

(65) Prior Publication Data
US 2018/0218648 A1 Aug. 2, 2018

Related U.S. Application Data

(60) Provisional application No. 62/212,119, filed on Aug. 31, 2015.

(51) Int. Cl.
*G09B 23/30* (2006.01)
*G09B 23/32* (2006.01)
(Continued)

(52) U.S. Cl.
CPC ............. *G09B 23/32* (2013.01); *G06F 30/23* (2020.01); *G09B 23/30* (2013.01); *G06F 2111/10* (2020.01)

(58) Field of Classification Search
CPC .. G06F 17/5095; G06F 17/5018; G06F 17/50; G09B 23/30; G01B 5/30
See application file for complete search history.

(56) References Cited

U.S. PATENT DOCUMENTS 3,757,431 A    9/1973   Daniel
4,261,113 A    4/1981   Alderson
(Continued)

OTHER PUBLICATIONS

Viaatouki, "Latest Developments of LS-Dynatest Dummy Models", Oct. 2014 [retrieved on Oct. 19, 2016]. Retrieved from the Internet: https://www.dynamore.se/en/resources/papers/2014-nordic-is-dyna-forum-2013-presentations/latest-developments-of-is-dyna-test-dummy-models>, entire document.

(Continued)

*Primary Examiner* — Brandi N Hopkins
(74) *Attorney, Agent, or Firm* — Howard & Howard Attorneys PLLC (57) ABSTRACT

A customized chest response finite element model for a crash test dummy is disclosed. A method of creating the customized chest response finite element model for the crash test dummy includes the steps of identifying two borderline sets that match with certification test data profiles for a chest of the crash test dummy, varying material properties of components of the chest for the crash test dummy, defining a mapping function and allowing intermediate sets to be interpolated from the certification test data profiles, and creating a single chest response finite element model for the crash test dummy with a user-defined input parameter for the customized chest response finite element model that defines the customized response.

18 Claims, 5 Drawing Sheets

(51) Int. Cl.
*G06F 30/23* (2020.01)
*G06F 111/10* (2020.01)

(56) References Cited

U.S. PATENT DOCUMENTS

| | | | |
|---|---|---|---|
| 4,701,132 A * | 10/1987 | Groesch | G09B 23/28 |
| | | | 434/274 |
| 5,317,931 A * | 6/1994 | Kalami | G01B 5/30 |
| | | | 33/760 |
| 7,086,273 B2 | 8/2006 | Lipmyer | |
| 7,508,530 B1 | 3/2009 | Handman | |
| 8,407,033 B2 | 3/2013 | Cooper et al. | |
| 9,043,187 B2 | 5/2015 | Pang | |
| 9,355,575 B2 | 5/2016 | Wang | |
| 2006/0095235 A1 | 5/2006 | Furtado et al. | |
| 2011/0144955 A1 | 6/2011 | Cooper et al. | |
| 2012/0173213 A1 | 7/2012 | Pang | |
| 2013/0327164 A1 * | 12/2013 | Wang | G09B 23/30 |
| | | | 73/866.4 |

OTHER PUBLICATIONS

International Search Report and Written Opinion (PCT/US2016/049414); dated Nov. 23, 2016.
International Preliminary Report on Patentability (PCT/US16/49414); Date of Mailing: Aug. 24, 2017.
International Preliminary Report on Patentability (PCT/US16/49414); Date of Mailing: Mar. 5, 2018.

\* cited by examiner

CUSTOMIZED CHEST RESPONSE FINITE ELEMENT MODEL FOR CRASH TEST DUMMY AND METHOD

CROSS-REFERENCE TO RELATED APPLICATION(S)

This application is the National Stage of International Patent Application No. PCT/US2016/049414, filed on Aug. 30, 2016, which claims priority to U.S. Provisional Patent Application, Ser. No. 62/212,119, filed on Aug. 31, 2015, the contents of which are expressly incorporated herein by reference in their entirety.

BACKGROUND OF THE INVENTION

1. Field of the Invention

The present invention relates generally to crash test dummies and, more particularly, to a customized chest response finite element model for a crash test dummy and method of creating the customized chest response finite element model.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage assembly, abdomen, pelvis assembly, right and left arm assemblies, and right and left leg assemblies. Generally, the rib cage assembly includes a plurality of ribs. The ribs are typically connected to the spine assembly.

Currently, there is dummy-to-dummy variability seen in chest deflection of physical test dummies in certification, sled, and vehicle testing due to differences in materials, manufacturing, and environment. As a result, there is a need in the art for a chest finite element model to enable users to adjust a stiffness of a thorax based on their hardware or physical crash test dummy so as to quantify its characteristics from a thorax pendulum certification level to their sled or vehicle environment. There is also a need in the art for a chest finite element model that not only captures a phenomenon of variability, but also allows users to perform robustness studies using extremes of certification corridors. Thus, there is a need in the art for a customized chest response finite element model for a crash test dummy and method of creating the customized chest response finite element model that meets at least one of these needs.

SUMMARY OF THE INVENTION

Accordingly, the present invention provides a customized chest response finite element model for a crash test dummy.

The present invention also provides a method of creating the customized chest response finite element model for a crash test dummy including the steps of identifying two borderline sets that match with certification test data profiles for a chest of the crash test dummy, varying material properties of components of the chest for the crash test dummy, defining a mapping function and allowing intermediate sets to be interpolated from the certification test data profiles, and creating a single chest response finite element model for the crash test dummy with a user-defined input parameter for the thorax that defines the customized response.

One advantage of the present invention is that a new customized chest response finite element model and method is provided for a crash test dummy. Another advantage of the present invention is that the customized chest response finite element model and method provides a customized chest finite element model that bridges a gap between reality and simulation by better capturing hardware behavior, and lays a framework for future models applicable to other parts. Yet another advantage of the present invention is that the customized chest response finite element model and method enables users to adjust a stiffness and contact algorithm parameters of a thorax based on their hardware test dummy so as to quantify its characteristics from the thorax pendulum certification level to their sled or vehicle environment. Still another advantage of the present invention is that the customized chest response finite element model and method not only captures the phenomenon of variability, but also allows users to perform robustness studies using extremes of certification corridors.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
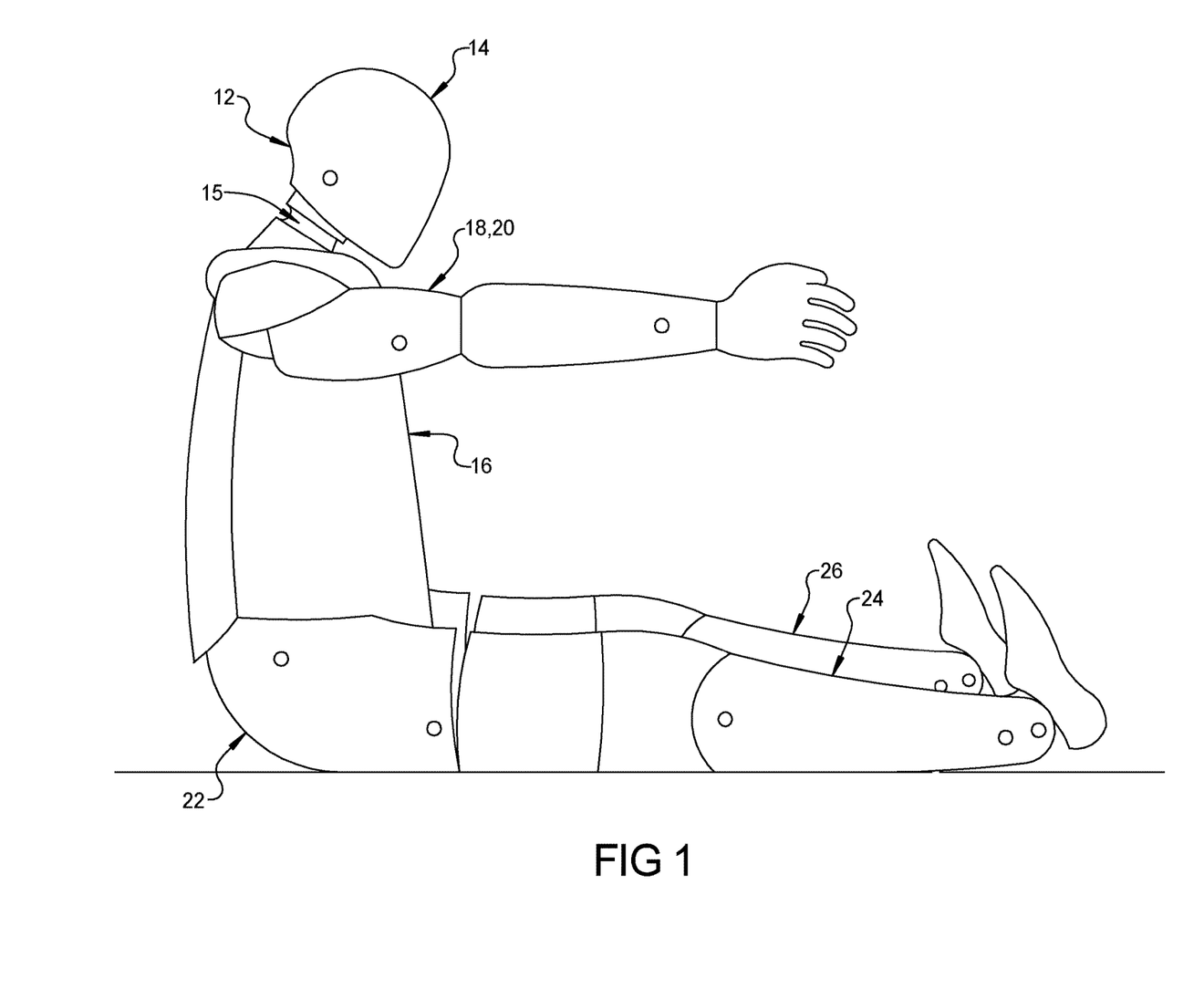
FIG. 1 is a perspective view of one embodiment of a crash test dummy, according to the present invention.

Referring to the drawings and in particular FIG. 1, one embodiment of a crash test dummy, according to the present invention, is generally indicated at 12. The crash test dummy 12 is of a fiftieth percentile (50%) male type and is illustrated in a seated position. This crash test dummy 12 is used primarily to test the performance of automotive interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. The crash test dummy 12 also includes a spine assembly, generally indicated at 15, having an upper end mounted to the head assembly 14 and a lower end extending into a torso area of the crash test dummy 12. It should be appreciated that the spine assembly 15 includes a neck (not shown) attached to the head assembly 14.

The torso area of the crash test dummy 12 also includes a rib cage or torso assembly, generally indicated at 16, connected to the spine assembly 15. The crash test dummy 12 also has a pair of arm assemblies including a right arm assembly, generally indicated at 18, and a left arm assembly, generally indicated at 20, which are attached to the spine assembly 15 of the crash test dummy 12. It should be appreciated that an example of a rib cage assembly 16 for a crash test dummy is disclosed in U.S. Pat. No. 9,355,575, issued May 31, 2016, the entire disclosure of which is hereby expressly incorporated by reference. It should be appreciated that a lower end of the spine assembly 15 is connected to a lumbar-thoracic adapter (not shown), which is connected to a lumbar to pelvic adapter (not shown).

As illustrated in the FIG. 1, the crash test dummy 12 includes a pelvis assembly, generally indicated at 22, connected to the adapter. The crash test dummy 12 also includes a right leg assembly 24 and a left leg assembly 26, which are attached to the pelvis assembly 22. It should be appreciated that various components of the crash test dummy 12 may be covered in a polyvinyl skin such as a flesh and skin assembly for biofidelity of the crash test dummy 12.

Referring to FIGS. 2A-2D, one embodiment of a single customized chest response finite element model 30, according to the present invention, is disclosed for the chest or rib cage assembly 16 of the crash test dummy 12. The model 30 is to be carried out on a computer system that includes a computer having a memory, a processor, a display, and a user input mechanism, such as a mouse or keyboard (not shown). The model 30 is implemented on the computer system in MATLAB, which is commercially available from MathWorks, coupled with other lower level languages. Efficient numerical algorithms (Genetic Algorithm) are used and coded, making it possible that a complete analysis can be done within minutes on a Pentium computer of the computer system. It should be appreciated that the computer system is conventional and known in the art.

Figure 2A:
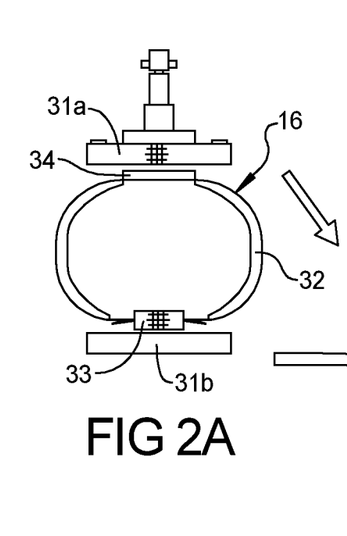
FIGS. 2A-2D are diagrammatic views of a customized chest response finite element model, according to one embodiment of the present invention, for the crash test dummy of FIG. 1.
Figures 2B, 2C, 2D:
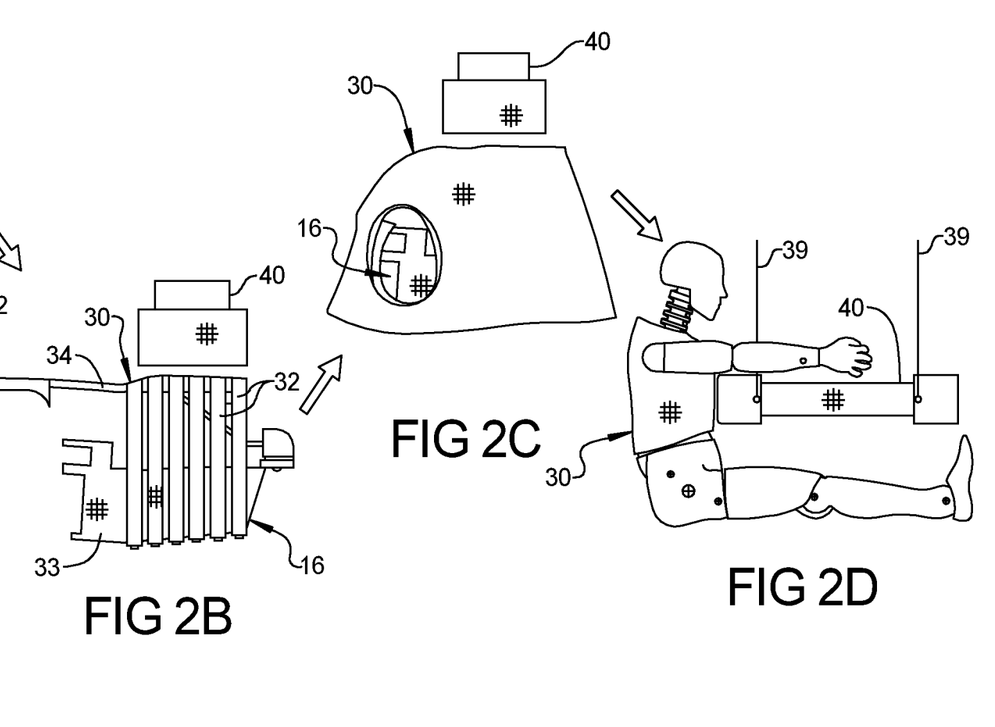

As illustrated in FIGS. 2A-2D, the customized chest response finite element model is generally indicated at 30. As illustrated in FIG. 2A, the customized chest response finite element model 30 includes an upper mount 31a and a lower mount 31b. As illustrated in FIG. 2A, the customized chest response finite element model 30 includes a rib cage assembly 16 disposed between the upper mount 31a and the lower mount 31b and includes a plurality of ribs 32. As illustrated in FIG. 2B, the rib cage assembly 16 includes one or more ribs 32. The ribs 32 extend between a spine box 33 and a sternum or thorax 34. As illustrated in one embodiment, the ribs 32 are generally arcuate and rectangular in shape, but may be any suitable shape. The ribs 32 are vertically spaced along the spine box 33 and thorax 34. The ribs 32 are connected to the spine box 33 and thorax 34 by a suitable mechanism such as fasteners (not shown). Each of the ribs 32 has a general "C" shape. In the embodiment illustrated, the rib cage assembly 16 includes three different sets of ribs 32 representing nominal, soft, and stiff response for the thorax 34 of the crash test dummy 12. To construct the customized chest response finite element model 30, all levels of chest or thorax correlation are evaluated to ensure that the response was reasonable. As illustrated in FIG. 2C, the customized chest response finite element model 30 includes the rib cage assembly 16. As illustrated in FIGS. 2C and 2D, the customized chest response finite element model 30 is subjected to a modeled pendulum similar to a physical pendulum to be described. It should be appreciated that the chest hardware of the crash test dummy 12 includes complex structural components involving ribs, bib, sternum, jacket, ensolite foam, spine box, and a transducer to measure the chest deflection of the rib cage assembly 16 of the crash test dummy 12.

Figure 3A:
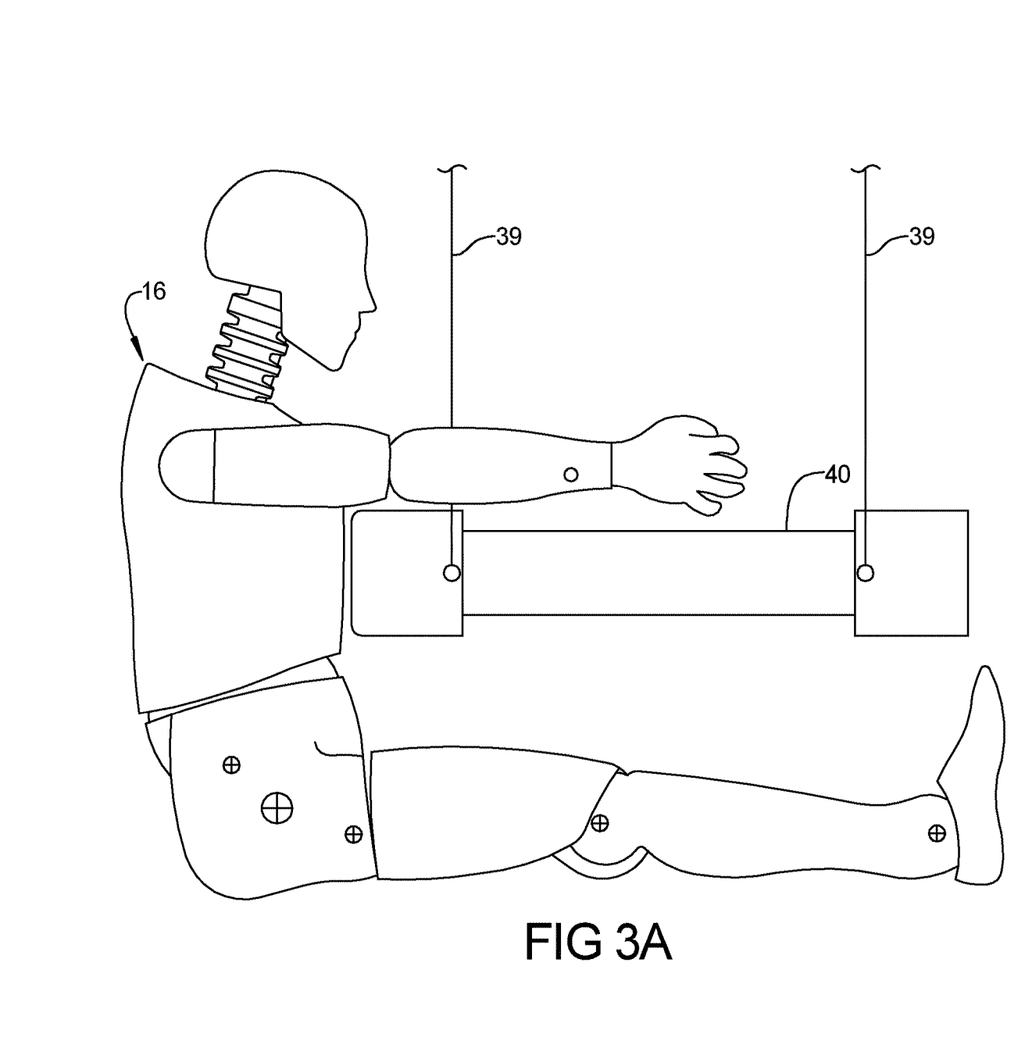
FIGS. 3A and 3B are elevational and perspective views of a chest pendulum impact test for the chest response finite element model of FIGS. 2A-2D of the crash test dummy of FIG. 1.
Figure 3B:
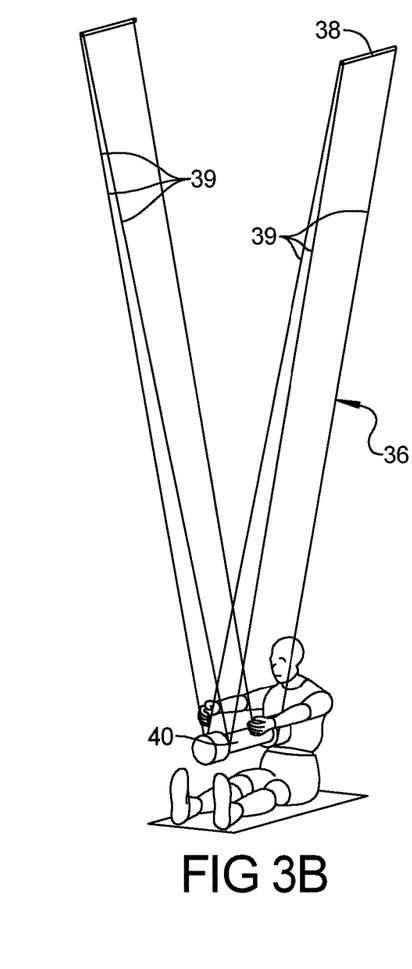

Referring to FIGS. 3A and 3B, an apparatus, generally indicated at 36, for chest pendulum impact testing pendulum impact testing for thorax or chest pendulum certification tests for the crash test dummy 12 is shown. The apparatus 36 includes a frame 38 having cables 39 for the rib cage assembly 16 of the crash test dummy 12. The apparatus 36 includes a pendulum 40 pivotally connected by the cables 39 to the frame 38. As illustrated, the pendulum 40 has one end that produces the chest deflection of the rib cage assembly 16 as illustrated in FIG. 3A and FIG. 3B. In one embodiment, the pendulum 40 produces a chest pendulum deflection impact test at an impact speed of 3 m/s. In another embodiment, the pendulum 40 produces a chest pendulum deflection impact test at 6.7 m/s. It should be appreciated that a chest low speed certification test for the crash test dummy 12 at 3 m/s allows for a 5 mm spread in chest deflection of the rib cage assembly 16 of the crash test dummy 12.

For creating the customized chest response finite element model 30, a method includes the step of identifying two borderline sets (e.g., FIGS. 4A-4C and 5A-5C) that matched reasonably well with the extreme certification test data profiles of the rib cage assembly 16 or chest of the crash test dummy 12 using the apparatus 36. The method also includes the step of varying the material properties of key components of the rib cage assembly 16. The method may include the step of varying finite element contact algorithm parameters of the chest response finite element model 30 for components of the chest or rib cage assembly 16. The finite element contact algorithm parameters include contact friction of the components. Then, the method includes the step of defining a mapping function and allowing intermediate sets to be interpolated from extremes; thus matching a best match to any certification could be achieved. The method further includes the step of creating a single chest response finite element model 30 for the crash test dummy 12 with a user-defined 'input parameter' for the chest response finite element model 30 that defines the 'customized' response, which is equal to the chest deflection peak seen at the certification level for the rib cage assembly 16 using the apparatus 36. The model 30 then internally calibrates material cards of components such as the thorax 34 of the rib cage assembly 16 using a parameter script to reproduce a certification chest deflection within 0.01 mm accuracy of a specified input. It should also be appreciated that a method of material modeling for crash test dummy finite element models is disclosed in U.S. Pat. No. 9,043,187 to Pang, the entire disclosure of which is hereby incorporated by reference.

The chest deflection is set between a maximum and a minimum of the certification corridors with a default value corresponding to an average of the certification tests of the rib cage assembly 16 for the crash test dummy 12. In one embodiment, the chest deflection is set at a maximum of 21.5 mm and a minimum of 26.5 mm of the certification corridors. In another embodiment, the default value is set at 24.94 mm corresponding to the average of the 3 m/s certification tests of the rib cage assembly 16 for the crash test dummy 12. It should be appreciated that a focus in development was in a chest pendulum case where there was a larger variety of data which ensured that the finite element model 30 captured a wide range of physical test dummies such as the crash test dummy 12.

As previously described, there is dummy-to-dummy variability seen in the chest deflection in physical crash test dummies (in certification, sled and vehicle tests) such as the crash test dummy 12 due to differences in material, manufacturing, environment, aging effect and other factors.

Figure 4A:
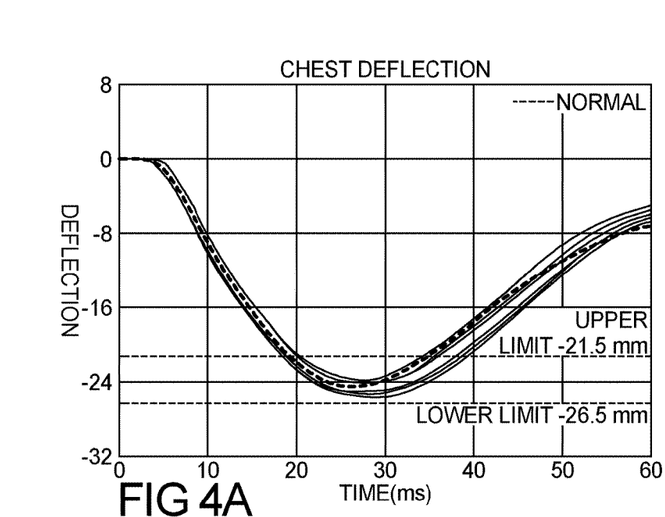
FIGS. 4A-4C are graphical views of one example of pendulum force, force deflection, and chest deflection harmonized for the chest pendulum impact test of FIG. 3.
Figure 4B:
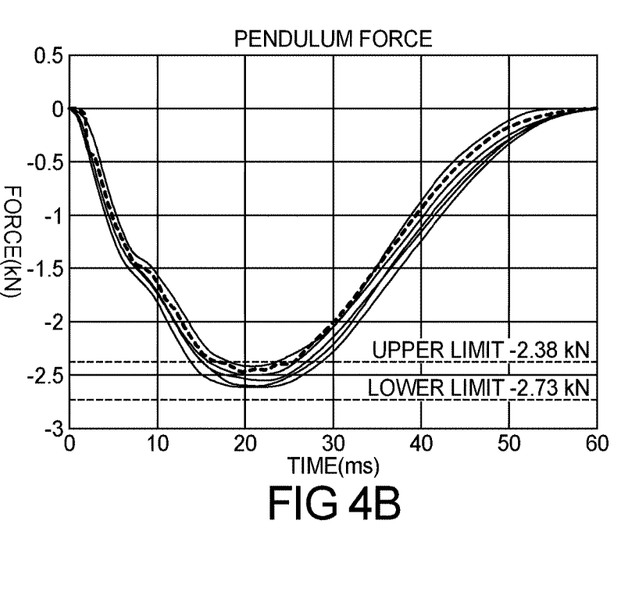
Figure 4C:
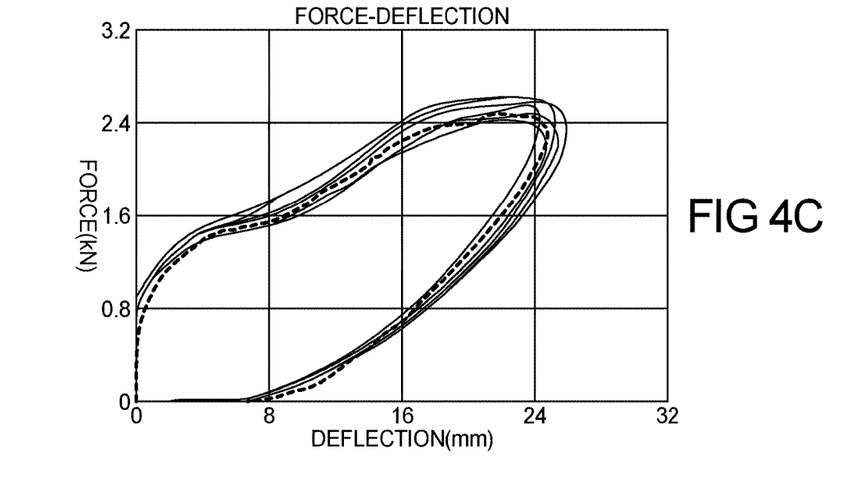
Figure 5A:
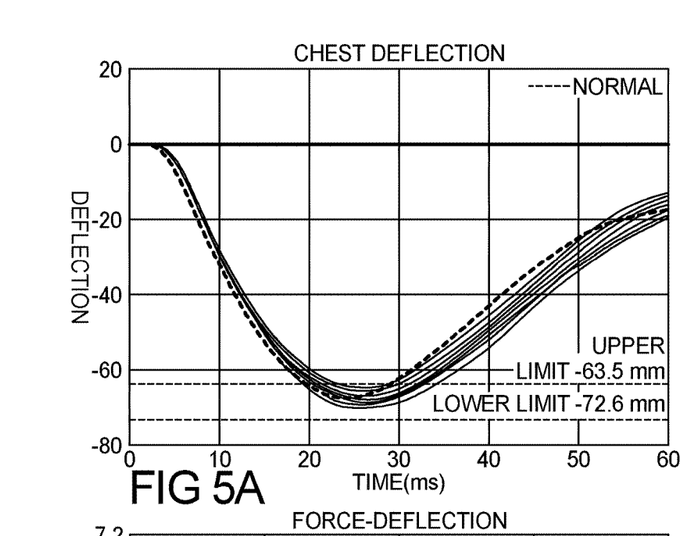
FIGS. 5A-5C are graphical views of another example of pendulum force, force deflection, and chest deflection harmonized for the chest pendulum impact test of FIG. 3.
Figure 5B:
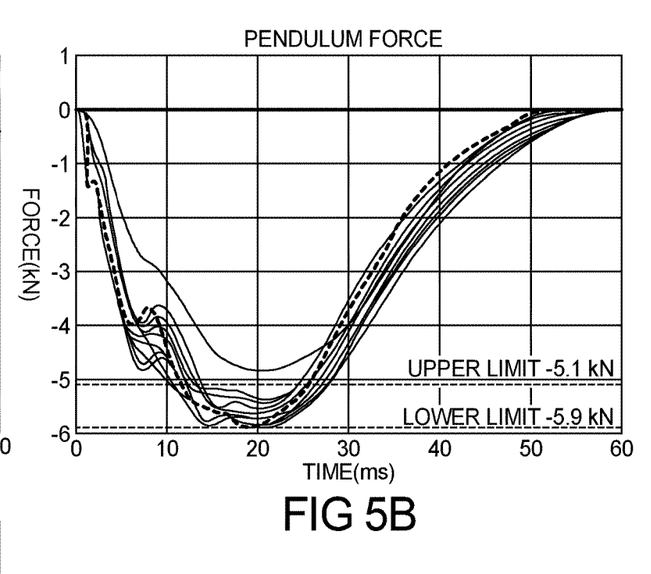
Figure 5C:
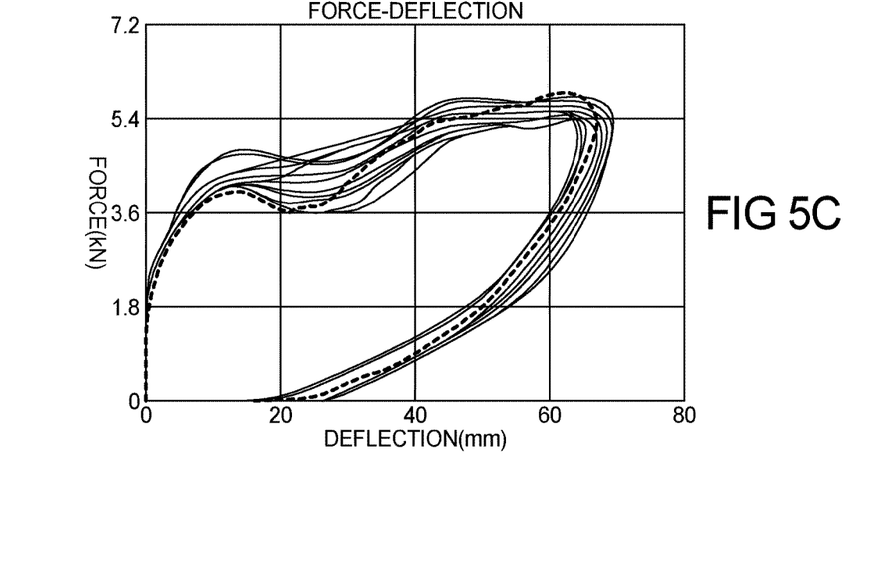

As illustrated in FIGS. 4A-4C, a harmonized chest deflection, pendulum force, and force deflection, respectively, is shown for the pendulum impact test at 3 m/s. As illustrated in FIGS. 5A-5C, a harmonized chest deflection, pendulum force, and force deflection, respectively, is shown for the pendulum impact test at 6.7 m/s. The customized chest response finite element model 30 allows adjustment of a stiffness of components such as the thorax 34 based on the physical hardware of the crash test dummy 12, which might range from stiff at one end to soft at another end of the certification corridor. It should be appreciated that a method of modeling dynamic response changes in anthropomorphic dummy is disclosed in U.S. Pat. No. 8,407,033 to Cooper et al., the entire disclosure of which is hereby incorporated by reference. It should be appreciated that this customization, based on certification test data from the physical crash test dummy 12, enables the user to accurately quantify or predict the chest deflection characteristics of the chest of the crash test dummy 12 at the sled or vehicular level.

The reliability of the customized chest response finite element model 30 was validated across numerous component, sled and vehicle load cases. The customized chest response finite element model 30 consistently showed about a 20% difference in peak chest deflection between the softest and stiffest thorax sets of the rib cage assembly 16 of the crash test dummy 12. It should be appreciated that, although the customized chest response finite element model 30 was developed for a particular brand of crash test dummies 12, through customization, the chest response finite element model 30 can accurately represent the deflection for any thorax of a rib cage assembly or chest for the crash test dummy 12.

Accordingly, the present invention is a customized chest response finite element model 30 that can precisely represent any physical crash test dummy 12 passing certification, thus giving better control of chest deflection prediction. The customized chest response finite element model 30 is a first of its kind model that bridges the gap between reality and simulation by taking variability into account. In addition, the customized chest response finite element model 30 provides the framework for future finite element models and can be applied to other parts to better capture hardware behavior of the crash test dummy 12.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method of creating a customized chest response finite element model for a crash test dummy, said method comprising the steps of:
    identifying two borderline sets that match with certification test data profiles for a chest of the crash test dummy;
    varying material properties of components of the chest for the crash test dummy;
    varying finite element contact algorithm parameters for the components of the chest;
    defining a mapping function and allowing intermediate sets to be interpolated from the certification test data profiles; and
    creating a single chest response finite element model for the crash test dummy with a user-defined input parameter for the chest response finite element model that defines the customized response.

2. A method as set forth in claim 1 wherein the customized response is equal to a chest deflection peak for the chest at a certification level.

3. A method as set forth in claim 2 including the step of internally calibrating material cards for the chest using a parameter script to reproduce a certification chest deflection.

4. A method as set forth in claim 2 including the step of setting the chest deflection between a maximum and a minimum of certification corridors for the crash test dummy.

5. A method as set forth in claim 4 wherein the maximum is 21.5 mm and the minimum is 26.5 mm of the certification corridors.

6. A method as set forth in claim 3 wherein the chest response finite element model has within 0.01 mm accuracy of a specified input.

7. A method as set forth in claim 1 wherein the chest deflection is a default value corresponding to an average of 3 m/s of certification tests for the chest of the crash test dummy.

8. A method as set forth in claim 7 wherein the default value is 24.94 mm.

9. A method as set forth in claim 1 wherein the finite element contact algorithm parameters include contact friction of the components.

10. A method of creating a customized chest response finite element model for a crash test dummy comprising the steps of:
    identifying two borderline sets that match with certification test data profiles for a chest of the crash test dummy;
    varying material properties of components of the chest for the crash test dummy;
    varying finite element contact algorithm parameters for the components of the chest;
    defining a mapping function and allowing intermediate sets to be interpolated from the data profiles;
    creating a single chest response finite element model for the crash test dummy with a user-defined input parameter for the chest response finite element model that defines the customized response; and
    internally calibrating material cards for the chest using a parameter script to reproduce a certification chest deflection for the chest response finite element model.

11. A method as set forth in claim 10 wherein the customized response is equal to a chest deflection peak for the chest at a certification level.

12. A method as set forth in claim 10 wherein the chest response finite element model has within 0.01 mm accuracy of a specified input.

13. A method as set forth in claim 10 including the step of setting the chest deflection between a maximum and a minimum of certification corridors.

14. A method as set forth in claim 13 wherein the maximum is 21.5 mm and the minimum is 26.5 mm of the certification corridors.

15. A method as set forth in claim 10 wherein the chest deflection is a default value corresponding to an average of 3 m/s of certification tests for the chest of the crash test dummy.

16. A method as set forth in claim 15 wherein the default value is 24.94 mm.

17. A method as set forth in claim 10 wherein the finite element contact algorithm parameters include contact friction of the components.

18. A method of creating a customized chest response finite element model for a crash test dummy, said method comprising the steps of:
  identifying two borderline sets that match with certification test data profiles for a chest of the crash test dummy;
  varying material properties of components of the chest for the crash test dummy;
  varying finite element contact algorithm parameters comprising contact friction of the components of the chest;
  defining a mapping function and allowing intermediate sets to be interpolated from the data profiles;
  creating a single chest response finite element model for the crash test dummy with a user-defined input parameter for the chest response finite element model that defines the customized response;
  internally calibrating material cards for the chest using a parameter script to reproduce a certification chest deflection for the chest response finite element model, wherein the customized response is equal to a chest deflection peak for the chest at the certification level, wherein the chest response finite element model has within 0.01 mm accuracy of a specified input;
  setting the chest deflection between a maximum and a minimum of certification corridors, wherein the maximum is 21.5 mm and the minimum is 26.5 mm of the certification corridors; and
  wherein the chest deflection is a default value corresponding to an average of 3 m/s of certification tests for the chest of the crash test dummy, and wherein the default value is 24.94 mm.

* * * * *